March 27, 1973  D. MERAZ, JR  3,723,214
METHOD OF MAKING A STEEL, GRAPHITE, PHENOLIC
ASBESTOS LAMINATE
Filed March 1, 1971
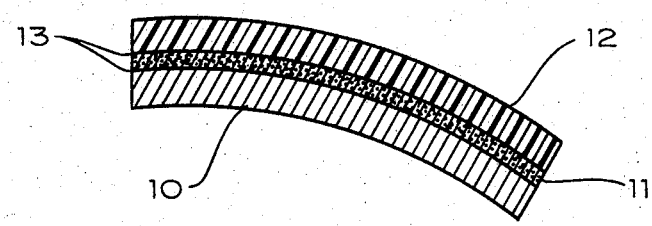
INVENTOR.
DANIEL MERAZ, JR.
BY: ROY MILLER
ATTORNEY.

United States Patent Office 3,723,214
Patented Mar. 27, 1973

3,723,214
METHOD OF MAKING A STEEL, GRAPHITE, PHENOLIC ASBESTOS LAMINATE
Daniel Meraz, Jr., China Lake, Calif., assignor to the United States of America as represented by the Secretary of the Navy
Filed Mar. 1, 1971, Ser. No. 119,949
Int. Cl. B32b 31/00
U.S. Cl. 156—87                                3 Claims

ABSTRACT OF THE DISCLOSURE

A high temperature laminate and method of fabrication consisting essentially of consecutive layers of steel, graphite and phenolic asbestos held together by a self-supporting adhesive film. This laminate is useful in the manufacture of rocket nozzles which withstand temperatures of 6,000° F. and above.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a high temperature laminate and the method of fabrication thereof.

High temperature laminates are difficult to manufacture. The general adhesives or cements necessary to hold the layers together have not been found to be completely satisfactory. Most of the finished laminates useful for rocket nozzle fabrication, for example, are lacking in strength and durability at temperatures of 6,000° F. and above. The present invention provides a steel, graphite phenolic asbestos laminate which has the desired high strength and reliability of extreme temperatures. The method of fabrication can be carried out expeditiously and with a minimum of skilled labor and supervision. The laminate thus formed can be precision machined.

DESCRIPTION OF THE DRAWING

The single figure is a schematic representation of the laminate made in accordance with this invention.

DESCRIPTION OF THE INVENTION

In accordance with the present invention a high temperature laminate shown in the single figure comprising a sheet of steel backing 10, a graphite insert 11 and phenolic asbestos heat barrier 12 held together by an epoxy resin adhesive film generally designated by numeral 13 was fabricated. The method in general comprises (1) heating sheets of phenolic asbestos and graphite in a convection oven at about 200° F. for about 16 hours until all moisture is removed; (2) heating sheets of steel to about 200° F.; (3) applying the selfsupporting adhesive to the back of the sheet of steel and pressing the heated graphite insert thereto; (4) applying the adhesive film to the exposed surface of the graphite and pressing the heated phenolic asbestos heat barrier thereto; (5) applying a press to the three layered assembly for about 1½ hours; (6) removing the press; and (7) allowing the assembly to cure. A hole is provided in the center of the asbestos heat barrier for the escapement of any air bubbles.

The removal of moisture from the graphite and phenolic layers by heating is critical to the success of the laminate. Failure to properly condition the graphite and asbestos will result in gassing during the cure of the adhesive.

The bonding agent used herein consists of epoxy paste, Parts A and B (sold as Shell Chemical 934). Part A is a gray epoxy paste and Part B is an amber amine curing agent. The viscosity of Part A is approximately 500,000 centipoise and will gradually thicken when stored at 75° F. or above; Part B has a viscosity of approximately 2,000 centipoises and is stable at 75° F. for more than 2 years. The mixing ratio is 100 Part A to 33 part B by weight. The materials must be mixed thoroughly and no thinners should be used. Temperatures prior to and during mixing are not critical but should be from 70 to 80° F.

The fabrication of a nozzle assembly for a missile is described in detail hereinafter to better illustrate the present method. Nozzle plates were precut from bars of 4130 steel and the grease or oil removed from the plate. The contact surface of the plate is then sand blasted with 100-grit silicon carbon for a better bonding grip. Threaded portions of the plate were masked with tape and the plate preheated in a convection oven to $200 \pm 5°$ F. for a minimum of 1 hour. The adhesive which was premixed is next applied evenly over the entire contact surface of the heated nozzle plate. The graphite nozzle insert which has been cut, all bonding surfaces having a finish of 150 to 350 micron surface for a better bonding grip, and preheated for about 16 hours at about 200° F. to remove all moisture is now hand pressed into place on the adhesive coated surface of the steel nozzle plate. Adhesive is then applied evenly to the exposed surface of the graphite insert. The nozzle heat barrier which has been cut from phenolic asbestos and also preheated in the convection oven to 200° F. is now pressed onto the graphite nozzle insert. A pinhole is provided in the center of the phenolic asbestos component to permit escape of any air bubbles which might be trapped. The assembly is now placed in a press and held there until excess adhesive has flowed evenly from around the mating surfaces. Excess adhesive is wiped off and more pressure is applied and the press cocked for about 1.5 hours. The nozzle assembly is removed and cured at room temperature (about 70° F.) for a minimum of 16 hours. The laminated nozzle can now be machined to get rid of any burrs or rough spots. The adhesive line should not be more than 0.010 inch maximum and the nozzle threads should be free of the adhesive.

Tests have shown that the laminate gives excellent performance at 6,000° F., and did not crack when shock or drop tests were performed.

What is claimed is:
1. The method for fabricating a laminate which comprises the steps of:
    (a) applying a first self-supporting adhesive film to a sheet of preheated steel;
    (b) superimposing a preconditioned graphite insert upon said first film;
    (c) applying a second self-supporting adhesive film to said graphite insert;

(d) superimposing a preconditioned phenolic asbestos heat barrier upon said second film;
(e) subjecting the assembly to pressure for about two hours;
(f) removing the assembly from the pressure; and
(g) curing at room temperature for about 16 hours; said films being two part adhesive systems consisting essentially of epoxy paste having a viscosity of about 500,000 centipoises and amine curing agent having a viscosity of about 2,000 centipoises in a mixing ratio of 100 parts by weight of said paste to about 33 parts by weight of said curing agent.

2. The method in accordance with claim 1 wherein the preconditioning comprises heating said graphite insert and asbestos barrier to temperatures of 200° F. for about 16 hours until all the moisture is removed.

3. The method in accordance with claim 2 wherein the asbestos heat barrier is provided with a pinhole in the central portion thereof for the escapement of gas bubbles trapped in the bonding film.

References Cited
UNITED STATES PATENTS

| | | | |
|---|---|---|---|
| 3,414,460 | 12/1968 | Hassert et al. | 161—205 X |
| 3,464,543 | 9/1969 | Kwiatanowski et al. | 161—205 X |
| 3,649,435 | 3/1972 | Varlas | 161—205 X |

STEPHEN J. LECHERT, Jr., Primary Examiner

U.S. Cl. X.R.

156—309, 322, 330; 161—205, 213